United States Patent [19]

Kitamura et al.

[11] Patent Number: 5,392,375
[45] Date of Patent: Feb. 21, 1995

[54] GLASS HAVING REFRACTIVE INDEX DISTRIBUTION

[75] Inventors: Naoyuki Kitamura; Kenichi Kinugawa; Jun Matsuoka; Kohei Fukumi; Isao Kondoh; Saburo Kose, all of Ikeda; Hiroshi Yamashita, Kawanishi; Makoto Kinoshita, Ikeda, all of Japan

[73] Assignee: Agency of Industrial Science and Technology, Tokyo, Japan

[21] Appl. No.: 103,130

[22] Filed: Aug. 9, 1993

Related U.S. Application Data

[60] Division of Ser. No. 13,554, Dec. 16, 1992, Pat. No. 5,261,938, which is a continuation of Ser. No. 773,819, Oct. 9, 1991, abandoned.

[30] Foreign Application Priority Data

Oct. 11, 1990 [JP] Japan .................. 2-274223

[51] Int. Cl.$^6$ ............................ G02B 6/18
[52] U.S. Cl. ..................... 385/124; 65/404; 65/17.3; 65/64; 65/102
[58] Field of Search .......... 65/3.11, 3.12, 18.1, 65/18.4, 64, 102, 104, 111, 117; 385/124

[56] References Cited

U.S. PATENT DOCUMENTS

| | | |
|---|---|---|
| 3,833,347 | 9/1974 | Angle . |
| 3,844,755 | 10/1974 | Angle . |
| 4,212,661 | 7/1980 | Jung .................. 65/18.1 |
| 4,582,655 | 4/1986 | Greener . |
| 4,778,505 | 10/1988 | Hirota . |
| 4,822,399 | 4/1989 | Kanamori et al. ......... 65/3.12 |
| 4,857,091 | 8/1989 | Geittner et al. ......... 65/3.12 |
| 4,932,990 | 6/1990 | Michie et al. ......... 65/3.12 |

OTHER PUBLICATIONS

J. Arndet et al, "Anomalous changes in some properties of silica glass densified at very high pressures", *Physics and Chemistry of Glasses*, vol. 10, pp. 117–124 (June. 1969).

H. Hummel et al, "Anomalous Optical Relaxation Behaviour of Densified $SiO_2$ Glass", *J. Non-Crystalline Solids,* 109 pp. 40–46 (1989).

J. D. MacKenzie, "High-Pressure Effects on Oxide Glasses: I, Densification in Rigid State"; *J. Amer. Ceramic Soc.*, 46, pp. 470–476 (Oct. 21,.

J. D. MacKenzie, "High-Pressure Effects on Oxide Glasses: II, Subsequent Heat Treatment", *J. Amer. Ceramic Soc.,* 46 pp. 461–470 (Oct. 1963).

Shand, Glass Engineering Handbook, (1959), P106–109.

Hampton, Some Problems Relating to Optical Glasses, vol. 54, Part 5, *The Proceedings of the Physical Society,* pp. 392–404 (Sep. 1, 1942).

*Primary Examiner*—Robert L. Lindsay
*Attorney, Agent, or Firm*—Armstrong, Westerman, Hattori, McLeland & Naughton

[57] ABSTRACT

A process for producing a glass having a rod refractive index distribution, which includes pressing a glass at a temperature below the glass transition temperature to form a glass having a density increased towards the surface layer thereof, or alternatively includes heating a glass at a temperature around the transition temperature at the lowest to prepare glass having a uniformly enhanced density and heating the treated glass under a pressure lower than the applied pressure at a temperature below the glass transition temperature of the glass to prepare a rod glass having a density increased towards the central portion.

2 Claims, 1 Drawing Sheet

GLASS HAVING REFRACTIVE INDEX DISTRIBUTION

This is a division of application Ser. No. 08/013,554, filed Dec. 16, 1992, now U.S. Pat. No. 5,261,938, which is a continuation of application Ser. No. 07/773,819, filed on Oct. 9, 1991, and now abandoned.

BACKGROUND OF THE INVENTION

The present invention relates to a process for producing a rod glass having an arbitrary refractive index distribution.

For example, in the conventional multimode optical fiber, the presence of a discontinuous difference in the refractive index between the core and the clad has frequently caused a mode transformation and a large loss in the bending of the optical fiber.

This problem has been solved through the use of an optical fiber wherein the refractive index of the core distributes in a parabolic manner.

Examples of the method of distributing the refractive index in a parabolic manner known in the art include a method wherein the core is laminated by the CVD process while changing the components of the reaction gas to distribute the refractive index, a method wherein a glass rod doped with an ion such as $Tl^+$ having a large electron polarizability is immersed in a melt of $KNO_3$ or the like to cause ion exchange between $Tl^+$ and $K^+$, thereby distributing the concentration of the dopant ions in a parabolic manner, and a method wherein the ion concentration is distributed by means of an electric field.

In the CVD process, however, the distribution is provided by controlling the flow rate of the reaction gas, which requires a very high level of technique.

In the method wherein use is made of the ion exchange, it is necessary to use a combination of ions having different diffusion rates, which requires much time and, at the same time, makes it difficult to control the distribution. Further, in the method of distributing the ions by means of an electric field through the change in the composition of the glass, it is difficult to provide a gradient electric field, so that the provision of a refractive index distribution as desired becomes very difficult.

SUMMARY OF THE INVENTION

An object of the present invention is to provide a process which enables a rod glass having an arbitrary refractive index distribution to be easily produced.

The above-described object of the present invention can be attained by a rod process for producing a glass having a refractive index distribution which comprises pressing a glass at a temperature below the glass transition temperature to form a rod glass having a density increased towards the surface layer thereof.

Further, the above-described object can be attained also by pressing a glass at a temperature around the glass transition temperature at the lowest to produce a treated glass having a uniformly enhanced density and heating the treated glass at a temperature below the glass transition temperature of said glass under a pressure lower than that used for the pressing to lower the density of the peripheral portion, thereby producing a rod glass having a density increased towards the central portion.

DESCRIPTION OF THE PREFERRED EMBODIMENTS

Figure 1:
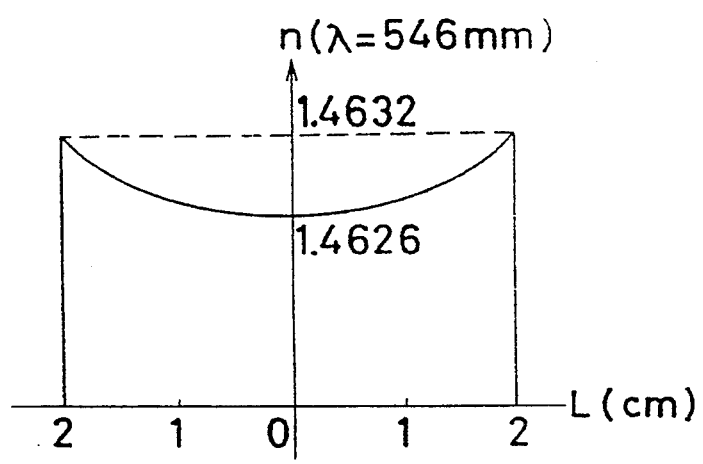
FIG. 1 is a graph showing a refractive index distribution of a quartz glass prepared in the first process of the present invention.

The process of the present invention is classified into two types depending upon the temperature used in the pressing of the glass.

Specifically, in the first process, the glass is pressed at a temperature below the glass transition temperature (hereinafter abbreviated to "Tg").

In the second process, the glass is pressed at a temperature around the Tg or above the Tg, that is, at a temperature around the Tg at the lowest. High pressure apparatuses, such as anvil type and belt type apparatuses, and hot isostatic pressing (HIP) apparatuses may be used as the pressing apparatus. The glass to be pressed may be any type as far as the composition is homogeneous. However, glasses less liable to crystallization, such as quartz glass (Tg: about 1100° C.) and BK7 (Tg: about 560° C.), are preferred.

There is no particular limitation on the form of the glass to be pressed. However, the glass should be uniformly pressed from the periphery. The pressure to be applied varies depending upon the high pressure apparatus. Specifically, in the anvil type and belt type high pressure apparatuses, the pressure to be applied is 50 GPa at the highest, while in the HIP apparatus, the pressure to be applied is about 1 GPa at the highest. The apparatus is selected according to the maximum refractive index value in the necessary refractive index distribution.

In order to prepare a treated glass less susceptible to change with time and having a good transparency, it is desired that the Tg and the treating temperature (Tp) having the following relationship:

$0.7 \leq Tp/Tg \leq 1.0$ (unit of temperature: K) When Tp/Tg is less than 0.7, the temperature range wherein the glass can be stably used is narrow. On the other hand, when the value is larger than 1.0, the precipitation of a crystal occurs during the pressing treatment depending upon the type of the glass, which causes the transparency to be lowered.

In the pressing and heating in the first process of the present invention, the glass may be first pressed by means of a pressure apparatus and then heated for a short period of time at a temperature below the Tg. Alternatively, the glass may be first heated at a temperature below the Tg and then pressed.

Since the viscosity of the glass is high in a region of temperatures below the glass transition temperature, the pressure applied to the glass to be pressed is not uniform and decreases from the surface portion towards the center portion.

However, the glass has a certain degree of viscosity even at a temperature below the Tg, so that the difference in the pressure between the surface portion and the central portion in the glass to be pressed becomes small with time. For example, in a quartz glass having a size of 1 $cm^3$, the pressure becomes substantially uniform under conditions of a temperature of 0.9 in terms of Tp/Tg and a holding time of about 5 min although it depends upon the type, size, Tp/Tg and intended gradient refractive index. Therefore, before the difference in the pressure between the surface portion and the central portion becomes zero, that is, after the pressing for 5 min or less in the above-described quartz glass, the pressed glass is cooled to room temperature to prepare a glass having a density increased towards the surface portion, that is, a glass having a refractive index increased towards the surface portion.

When the treating pressure is varied within a given treating time, the gradient refractive index of the resultant glass increases with increasing the pressure and decreases with increasing the treating time.

According to the above-described second process of the present invention, the nonuniformity of the pressure applied to the glass is alleviated by heating the starting glass having a homogeneous composition pressed by means of a high pressure apparatus for a sufficient period of time around the Tg or a predetermined range of temperatures above the Tg, or conducting the pressing treatment for a sufficient period of time while heating the glass at a temperature around the Tg. This provides a treated glass having a uniformly enhanced density free from the difference in the density between the surface layer portion and the central portion, that is, having a refractive index higher than that before the treatment. Since the variation in the treating pressure brings about a variation in the refractive index and the refractive index of the resultant glass increases with increasing the pressure, it is possible to prepare a uniformly treated glass having an arbitrary refractive index higher than that before the treatment.

In the second process of the present invention, the heat treatment is conducted under a pressure lower than the treating pressure used for the treated glass at a temperature below the Tg. This lowers the density of the treated glass from the surface portion towards the central portion. In this case, the lowering rate of the density decreases with approaching the central portion, and the central portion remains at a high density. Accordingly, when the cooling is conducted in this state, there is obtained a glass having such a refractive index distribution that the density increases towards the central portion.

In all the glasses prepared by the above-described first process and second process, the composition is homogeneous and there occurs no difference in the transmittance property although the refractive index distribution occurs due to the pressure. Specifically, the glass of the present invention is characterized by a uniform transmittance as opposed to the conventional distribution glass wherein the transmittance varies from site to site.

The present invention will now be described in more detail by referring to the following Examples.

EXAMPLE 1

A quartz glass having a size of 4 cm square was subjected to a hot isostatic pressing (HIP) treatment under a pressure of 150 MPa at a temperature of 1000° C. for 30 min. The resultant block of quartz glass was cut to measure the refractive index distribution. The results are given in FIG. 1 in terms of the relationship between the refractive index, n, and the distance, L, from the center of the block. The refractive index decreased from the surface portion (1.4632) towards the internal portion (1.4626), and the change in the refractive index was 0.04%.

EXAMPLE 2

Figure 2:
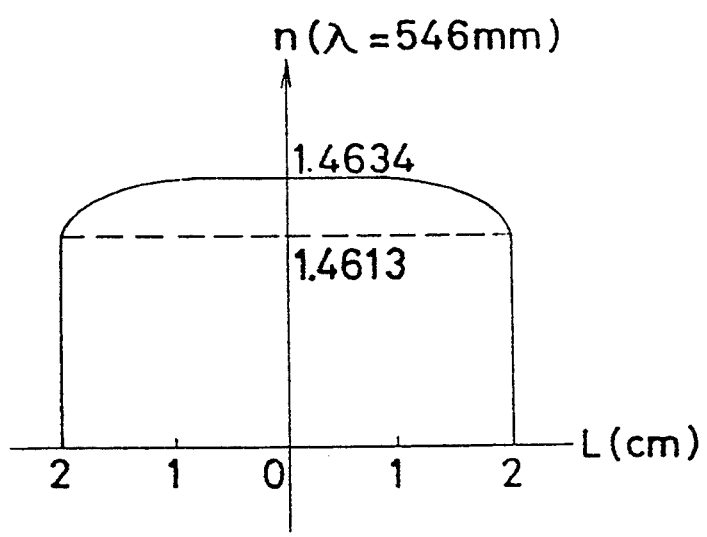
FIG. 2 is a graph showing a refractive index distribution of a quartz glass prepared in the second process of the present invention.

A quartz glass having a size of 4 cm square was subjected to a hot isostatic pressing (HIP) treatment under a pressure of 150 MPa at a temperature of 1200° C. for 2 hr to prepare a homogeneous treated glass. Thereafter, the glass was maintained in the air at 900° C. for 30 min. As with FIG. 1, the refractive index distribution of the resultant quartz glass is shown in FIG. 2. The refractive index increased from the surface portion (1.4613) towards the internal portion (1.4634), and the change in the refractive index was 0.14%.

As described above, according to the present invention, a glass having a refractive index distribution can be prepared in a short time.

Specifically, (1) a treated glass having a refractive index increased towards the surface portion can be prepared by pressing a glass having a homogeneous composition by means of a high pressure apparatus while heating the glass at a temperature below the glass transition temperature. For example, a rod lens having the same function as that of a concave lens is obtained from a cylindrical glass.

(2) When the glass is first pressed around the Tg or at a temperature above the Tg until the density becomes uniform and then cooled, it is possible to prepare a homogeneous treated glass having an arbitrary refractive index higher than that before the treatment through the variation in the treating conditions.

(3) When the treated glass prepared in the above item (2) is heat-treated again under a pressure lower than that used for the production of the above-described treated glass at a temperature below the Tg, there occurs a thermal relaxation of the surface, so that a glass having such a refractive index distribution that the refractive index at the central portion is high while the refractive index at the surface portion is low. For example, a rod lens having the same function as that of a convex lens is prepared from a cylindrical glass.

Therefore, in any case, it is possible to prepare a glass having an arbitrary refractive index distribution. In particular, it is possible to eliminate the difference in the transmittance between sites while substantially maintaining the optical characteristics which has been unattainable by the conventional CVD process or ion exchange process.

What is claimed is:

1. A rod glass article having a central portion and an outer portion, wherein said central portion has a higher refractive index than said outer portion, the composition of said rod glass is homogeneous, and the increase in said refractive index is uniform.

2. A rod glass article having a refractive index distribution and produced according to a method comprising pressing a starting glass having a uniform composition at its glass transition temperature or above it to produce a treated glass having a uniformly higher refractive index than the starting glass and heating the treated glass under a pressure lower than that as applied above at a temperature below the glass transition temperature of said glass to produce a rod glass article having a refractive index increased towards a central portion of said rod glass article, wherein the glass transition temperature (Tg) and the temperature during pressing (Tp) has the following relationship: $1.0 \leq Tp/Tg \leq 1.3$ where Tp and Tg are each expressed in Kelvin, thereby producing a rod glass article having a uniform composition and a uniform refractive index distribution.

* * * * *